UNITED STATES PATENT OFFICE.

ELI WAUGAMAN, OF DERRY TOWNSHIP, WESTMORELAND COUNTY, PA.

IMPROVEMENT IN COMPOUNDS FOR TREATING SEEDS.

Specification forming part of Letters Patent No. 149,898, dated April 21, 1874; application filed March 30, 1874.

*To all whom it may concern:*

Be it known that I, ELI WAUGAMAN, of Derry township, in the county of Westmoreland and State of Pennsylvania, have invented a new and useful Improvement in Compound for Promoting the Germination and Growth of Seeds; and I do hereby declare the following to be a full, clear, and exact description thereof.

My invention relates to a class of compounds allied to fertilizers, but are not intended to be used broadcast upon the land, as are fertilizers in the general acceptation of the term. The invention consists in a compound formed from sugar or acetate of lead and sulphate of zinc as the principal ingredients, which are dissolved in water in the manner hereinafter specified, and to which other ingredients may be added without departing from the spirit of my invention.

To enable others skilled in the art to make and use my compound, I will proceed to specifically describe the same.

I take of sugar or acetate of lead, two (2) ounces; sulphate of zinc, two (2) ounces, and water, (warm or cold,) six (6) gallons. The sugar of lead and sulphate of zinc, in or about the proportions specified, are dissolved in the water, and the solution is ready for use in the following manner: The seeds, whether grain or garden seeds, are to be submerged in the solution from twelve to thirty-six hours, or until they swell or bud—the budding being the indication for removal of the seed—after which they are removed from the solution, and planted or sown in the ordinary manner.

Seeds treated by my compound, and in the manner above described, produce plants of vigorous growth, greatly increased yield, arrive at maturity much sooner than by the ordinary methods of planting and manuring, and do not seem to suffer from drouth. This compound is also effective as a protection against worms and insects liable to attack the seed and plant.

Having thus described my invention, I claim—

A compound, containing sugar or acetate of lead and sulphate of zinc, for treating seed, substantially as and for the purpose specified.

In testimony whereof I, the said ELI WAUGAMAN, have hereunto set my hand.

ELI WAUGAMAN.

Witnesses:
 JAMES I. KAY,
 F. W. RITTER, Jr.